(12) United States Patent
Han

(10) Patent No.: US 10,961,851 B2
(45) Date of Patent: Mar. 30, 2021

(54) ROTOR DISK ASSEMBLY AND GAS TURBINE INCLUDING THE SAME

(71) Applicant: DOOSAN HEAVY INDUSTRIES & CONSTRUCTION CO., LTD., Changwon-si (KR)

(72) Inventor: Sang Sup Han, Daejeon (KR)

(73) Assignee: Doosan Heavy Industries Construction Co., Ltd, Gyeongsangnam-do (KR)

(*) Notice: Subject to any disclaimer, the term of this patent is extended or adjusted under 35 U.S.C. 154(b) by 155 days.

(21) Appl. No.: 16/149,047

(22) Filed: Oct. 1, 2018

(65) Prior Publication Data

US 2019/0153867 A1 May 23, 2019

(30) Foreign Application Priority Data

Nov. 21, 2017 (KR) .................. 10-2017-0155498

(51) Int. Cl.
| | |
|---|---|
| *F01D 5/02* | (2006.01) |
| *F01D 5/22* | (2006.01) |
| *F01D 25/28* | (2006.01) |
| *F02C 3/04* | (2006.01) |
| *F01D 5/06* | (2006.01) |

(52) U.S. Cl.
CPC .............. *F01D 5/025* (2013.01); *F01D 5/027* (2013.01); *F01D 5/066* (2013.01); *F01D 5/22* (2013.01); *F01D 25/285* (2013.01); *F02C 3/04* (2013.01); *F05D 2220/3216* (2013.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 2,610,786 A | * | 9/1952 | Howard | ..................... F01D 9/00 415/209.1 |
| 4,844,694 A | * | 7/1989 | Naudet | ................... F01D 5/066 416/198 A |

(Continued)

FOREIGN PATENT DOCUMENTS

| | | |
|---|---|---|
| JP | H09-189298 A | 7/1997 |
| JP | 2008-157230 A | 7/2008 |
| KR | 10-2017-0086219 A | 7/2017 |

OTHER PUBLICATIONS

A Korean Office Action dated Feb. 1, 2019 in connection with Korean Patent Application No. 10-2017-0155498 which corresponds to the above-referenced U.S. application.

*Primary Examiner* — Aaron R Eastman
(74) *Attorney, Agent, or Firm* — Invenstone Patent, LLC

(57) ABSTRACT

Various embodiments provide a rotor disk assembly capable of preventing a slip between rotor disks when rotating, and capable of performing a balancing operation such that the center of gravity thereof is the same as that of a rotating shaft, and a gas turbine including the rotor disk assembly. The rotor disk assembly may include: a plurality of rotor disks disposed parallel to each other; a tie rod passing through the plurality of rotor disks and coupling the plurality of rotor disks to each other; a plurality of coupling depressions formed in each of facing surfaces of the plurality of rotor disks; and a plurality of coupling pins each having opposite ends inserted into the corresponding respective coupling depressions of the facing surfaces.

16 Claims, 4 Drawing Sheets

(52) U.S. Cl.
  CPC ...... *F05D 2230/60* (2013.01); *F05D 2240/24* (2013.01); *F05D 2260/83* (2013.01)

(56) References Cited

U.S. PATENT DOCUMENTS

| | | | | |
|---|---|---|---|---|
| 5,350,278 | A * | 9/1994 | Burge | F01D 5/066 |
| | | | | 416/198 A |
| 6,283,712 | B1 * | 9/2001 | Dziech | F01D 5/066 |
| | | | | 415/115 |
| 8,382,432 | B2 * | 2/2013 | Grissino | F16J 15/44 |
| | | | | 415/115 |
| 2004/0007830 | A1 * | 1/2004 | Uematsu | F01D 5/085 |
| | | | | 277/628 |
| 2010/0178160 | A1 * | 7/2010 | Liotta | F01D 5/066 |
| | | | | 415/173.7 |
| 2011/0268579 | A1 * | 11/2011 | Light | F04D 29/644 |
| | | | | 416/244 A |
| 2015/0023785 | A1 * | 1/2015 | Stanko | F04D 13/021 |
| | | | | 415/124.2 |
| 2016/0010481 | A1 * | 1/2016 | Gurao | F01D 5/025 |
| | | | | 415/134 |
| 2018/0291758 | A1 * | 10/2018 | Seo | F01D 5/087 |

* cited by examiner

【FIG. 1】
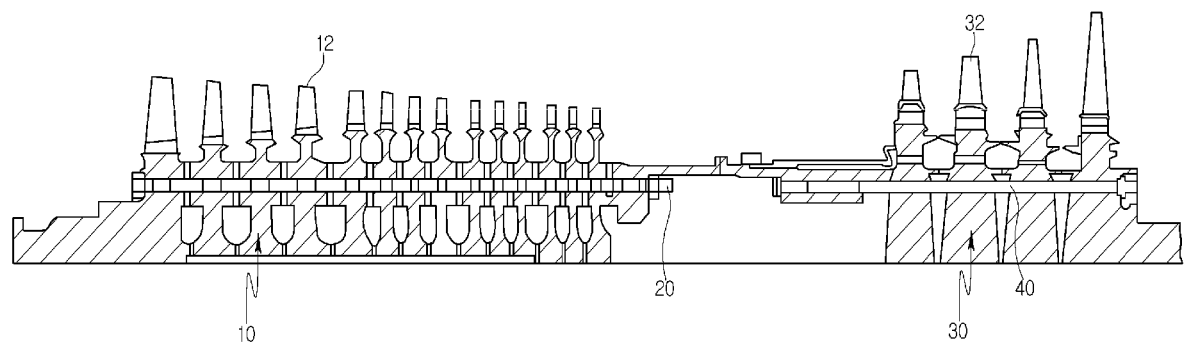
【FIG. 2】
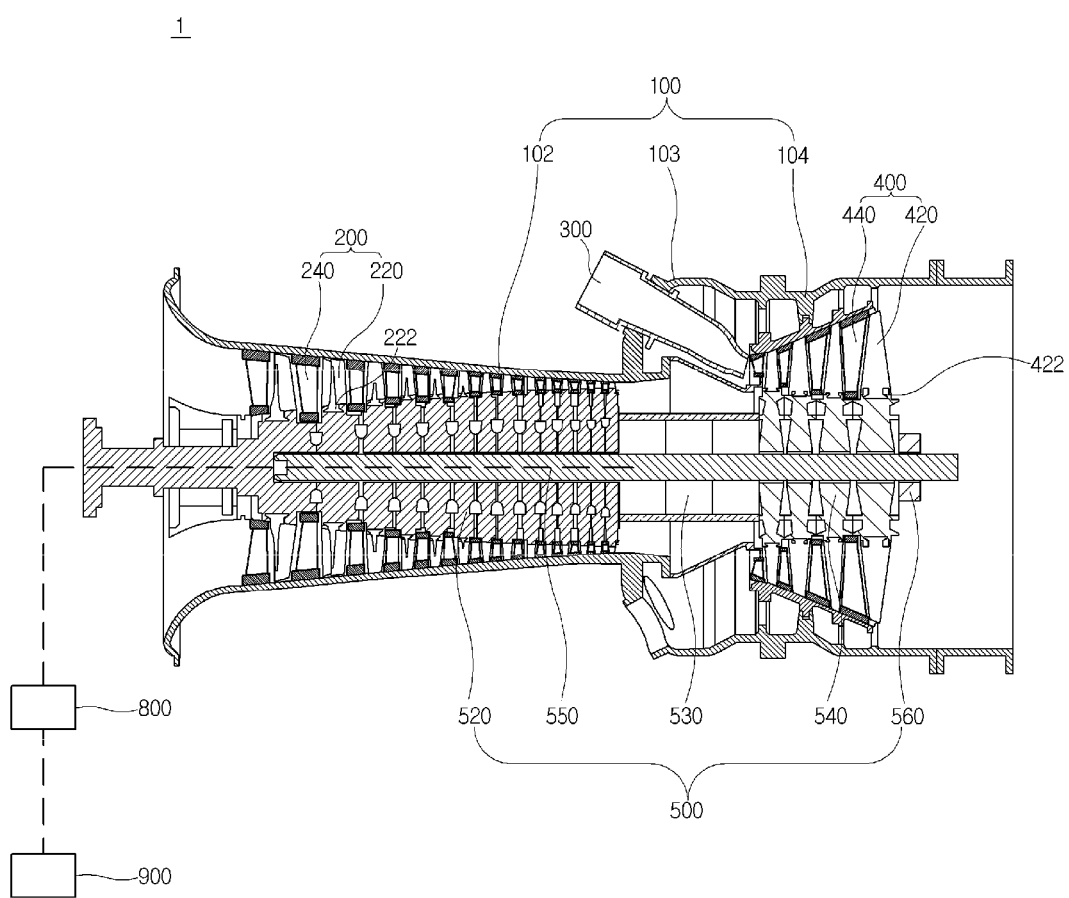

[FIG. 3]
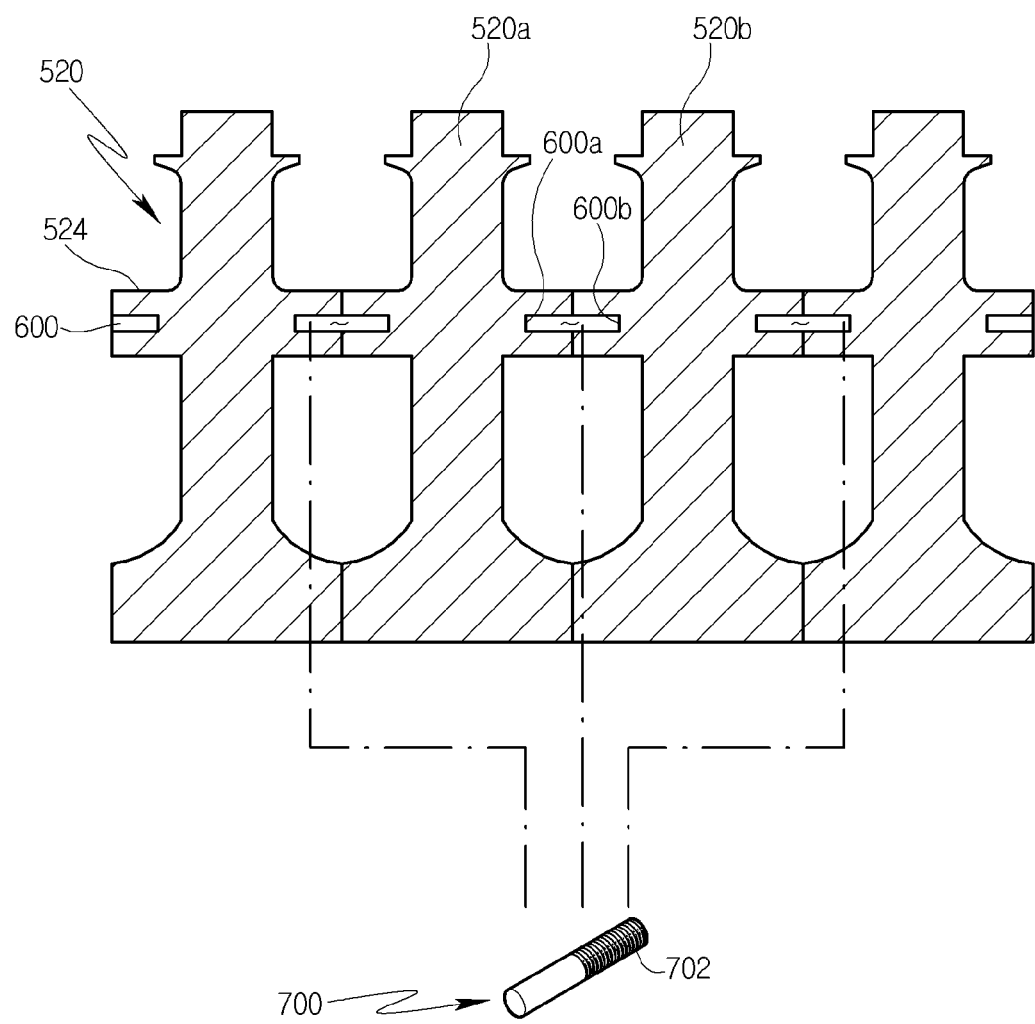

【FIG. 4】
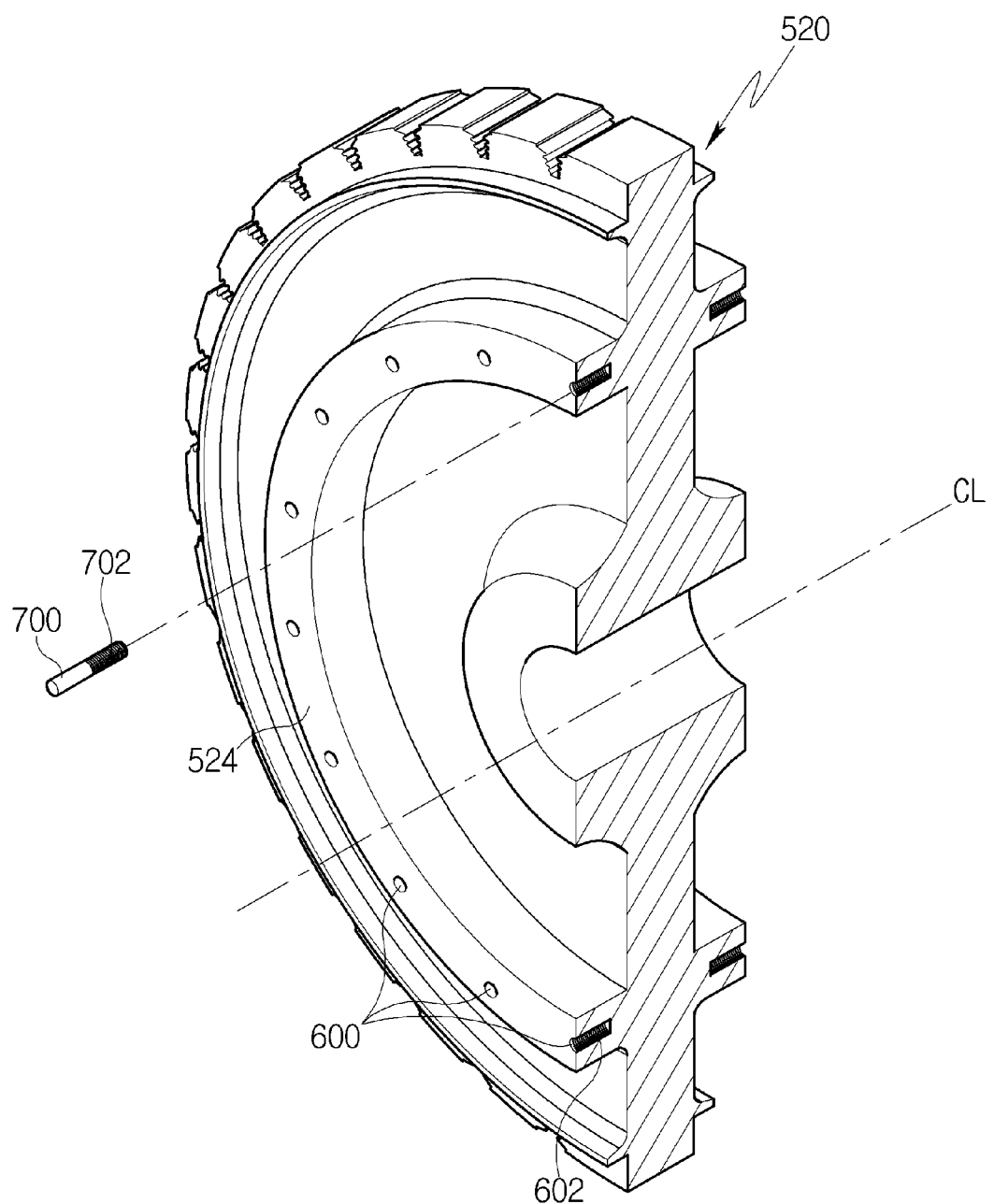

[FIG. 5]
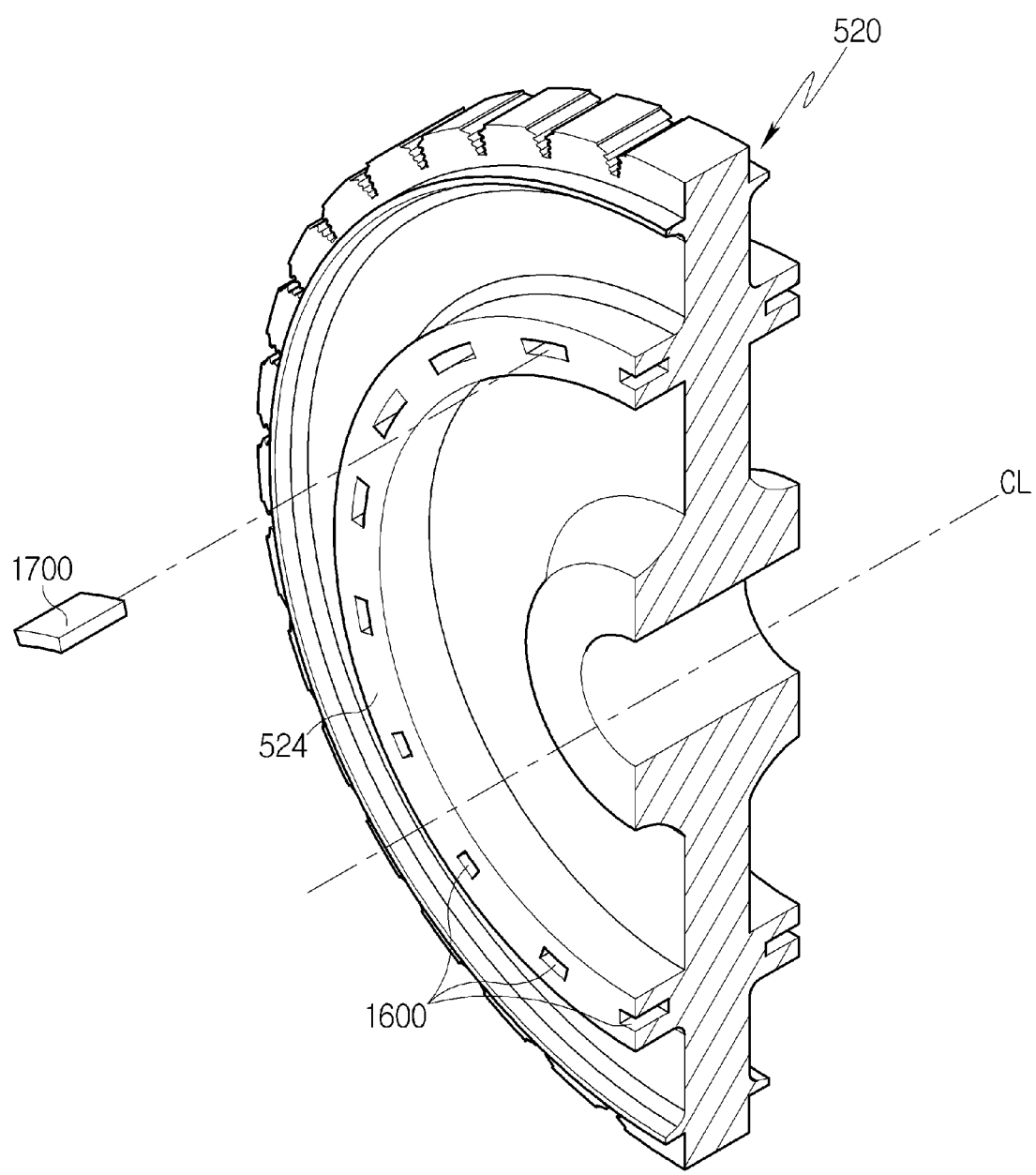

ROTOR DISK ASSEMBLY AND GAS TURBINE INCLUDING THE SAME

CROSS-REFERENCE TO RELATED APPLICATION(S)

This application claims priority to Korean Patent Application No. 10-2017-0155498, filed on Nov. 21, 2017, the disclosure of which is incorporated herein by reference in its entirety.

BACKGROUND OF THE DISCLOSURE

Field of the Disclosure

Exemplary embodiments of the present disclosure relate to a rotor disk assembly and a gas turbine including the rotor disk assembly. More particularly, a rotor disk assembly capable of preventing a slip between rotor disks when rotating, and capable of performing a balancing operation such that the center of gravity thereof is the same as that of a rotating shaft, and a gas turbine including such rotor disk assembly are disclosed.

Description of the Related Art

Generally, a turbine is a machine which converts energy of fluid such as water, gas, or steam into mechanical work. Typically, a turbo machine, in which a plurality of blades are embedded around a circumferential portion of a rotating body so that the rotating body is rotated at a high speed by impulsive force or reactive force generated by discharging steam or gas to the blades, is referred to as a turbine.

Such turbines are classified into a water turbine using energy of water located at a high elevation, a steam turbine using energy of steam, an air turbine using energy of high-pressure compressed air, a gas turbine using energy of high-temperature/high-pressure gas, and so forth.

Generally, the gas turbine includes a compressor, a combustor, a turbine, and a rotor, and is a kind of internal combustion engine, which converts thermal energy into mechanical energy by rotating the turbine in such a way that high-temperature and high-pressure combustion gas generated by mixing fuel with air compressed to a high pressure by the compressor and combusting the mixture is discharged to the turbine.

The gas turbine does not have a reciprocating component such as a piston of a four-stroke engine. Therefore, mutual friction parts such as a piston-and-cylinder are not present, so there are advantages in that there is little consumption of lubricant, the amplitude of vibration is markedly reduced unlike a reciprocating machine having high-amplitude characteristics, and high-speed driving is possible.

The rotor is provided to pass through central portions of the compressor, the combustor, and the turbine. Opposite ends of the rotor are rotatably supported by bearings. One end of the rotor is coupled to a driving shaft of an electrical generator.

The rotor includes a plurality of compressor rotor disks coupled to compressor blades, a plurality of turbine rotor disks coupled to turbine blades, and a torque tube configured to transmit the rotating force from the turbine rotor disks to the compressor rotor disks.

FIG. 1 is a diagram schematically illustrating a portion of a conventional gas turbine. In detail, referring to FIG. 1, the plurality of compressor rotor disks 10 are arranged parallel to each other along an axial direction of the rotor, and compressor blades 12 are coupled to each compressor rotor disk 10.

Here, the plurality of compressor rotor disks 10 are coupled by a spindle bolt 20 that passes through the compressor rotor disks 10 in the axial direction. In other words, the plurality of compressor rotor disks 10 are pressed onto each other by the spindle bolt 20 in a direction in which adjacent compressor rotor disks 10 come into close contact with each other, whereby the plurality of compressor rotor disks 10 are fixed to each other.

The plurality of turbine rotor disks 30 are also arranged parallel to each other along the axial direction of the rotor, and turbine blades 32 are coupled to each turbine rotor disk 30.

The plurality of turbine rotor disks 30 are pressed onto and coupled to each other by a spindle bolt 40 that passes through the turbine rotor disks 30 in the axial direction.

However, there is a problem in that despite the fact that the (compressor and turbine) rotor disks are pressed onto each other in the above-mentioned manner a slip may occur between the rotor disks due to centrifugal force generated by rotation of the rotor.

Furthermore, if the center of gravity of the rotor disks differs from that of the rotating shaft of the rotor, the rotor biasedly rotates, thus generating large vibrations. Hence, a problem arises in that it is difficult for the gas turbine to reliably operate.

SUMMARY OF THE DISCLOSURE

An object of the present disclosure is to provide a rotor disk assembly capable of preventing a slip between rotor disks when rotating, and capable of performing a balancing operation such that the center of gravity thereof is the same as that of a rotating shaft, and a gas turbine including the rotor disk assembly.

In accordance with one aspect of the present disclosure, a rotor disk assembly may includes: a plurality of rotor disks disposed parallel to each other; a tie rod passing through the plurality of rotor disks and coupling the plurality of rotor disks to each other; a plurality of coupling depressions formed in each of facing surfaces of the plurality of rotor disks; and a plurality of coupling pins each having opposite ends inserted into the corresponding respective coupling depressions of the facing surfaces.

Each of the rotor disks may include coupling protrusions protruding to respective opposite sides along a direction in which the plurality of rotor disks are arranged parallel to each other. The coupling depressions may be formed in each of the coupling protrusions.

The plurality of coupling depressions may be formed in each of the facing surfaces of the plurality of rotor disks along a circumferential direction of the rotor disks The coupling depressions formed in the facing surfaces of the plurality of rotor disks may face each other to be symmetric.

Each of the coupling pins may have a cylindrical shape.

Each of the coupling pins may have a curved surface that is concave toward a center axis of the rotor disks.

An external thread may be formed on an outer circumferential surface of one end of each of the coupling pins, and an internal thread corresponding to the external thread may be formed in the corresponding coupling depression into which the one end of the coupling pin is inserted.

The rotor disk assembly may further include a detection unit configured to detect a center of gravity of the rotor disks.

The rotor disk assembly may further include a control unit configured to determine an arrangement relationship or weight of the plurality of coupling pins such that the center of gravity of the rotor disks detected by the detection unit corresponds to a center axis of the rotor disks.

When the center of gravity of the rotor disks is displaced to one side from the center axis of the rotor disks, the control unit may determine the arrangement relationship or weight of the coupling pins such that a coupling pin having a relatively low weight is disposed at one side at which the center of gravity is located, or a coupling pin having a relatively high weight is disposed at a side opposite to the one side at which the center of gravity is located.

When the center of gravity of the rotor disks is displaced to one side from the center axis of the rotor disks, the control unit may determine the arrangement relationship or weight of the coupling pins such that the number of coupling pins disposed at one side at which the center of gravity is located is less than the number of coupling pins disposed at a side opposite to the one side at which the center of gravity is located.

Each of the coupling pins may be made of material having a high thermal expansion coefficient.

In accordance with another aspect of the present disclosure, a gas turbine may include: a casing; a compressor disposed in the casing and configured to draw air thereinto and compress the air to a high pressure; a plurality of combustors configured to mix fuel with the air compressed by the compressor and combust a mixture of the fuel and the air; a turbine configured to rotate a plurality of turbine blades using high-temperature and high-pressure combustion gas discharged from the combustor and generate electricity; and a rotor provided in a central portion of the casing such that the rotor passes through the compressor, the combustors, and the turbine, the rotor being rotatably supported by a bearing. The rotor may include: a plurality of compressor rotor disks coupled with compressor blades of the compressor, and disposed parallel to each other; a plurality of turbine rotor disks coupled with the turbine blades, and disposed parallel to each other; a torque tube coupling the compressor rotor disks with the turbine rotor disks; a tie rod passing through the compressor rotor disks, the turbine rotor disks, and the torque tube, and coupling the compressor rotor disks, the turbine rotor disks, and the torque tube with each other; a plurality of coupling depressions formed in each of facing surfaces of the plurality of compressor rotor disks; and a plurality of coupling pins each having opposite ends inserted into the corresponding respective coupling depressions of the facing surfaces.

Each of the compressor rotor disks may include coupling protrusions protruding to respective opposite sides along an axial direction of the rotor, and The coupling depressions may be formed in each of the coupling protrusions.

The plurality of coupling depressions may be formed in each of the facing surfaces of the plurality of compressor rotor disks along a circumferential direction of the compressor rotor disks.

The coupling depressions formed in the facing surfaces of the plurality of compressor rotor disks may face each other to be symmetric.

Each of the coupling pins may have a cylindrical shape.

Each of the coupling pins may have a curved surface that is concave toward a center axis of the rotor disks.

An external thread may be formed on an outer circumferential surface of one end of each of the coupling pins, and an internal thread corresponding to the external thread may be formed in the corresponding coupling depression into which the one end of the coupling pin is inserted.

The gas turbine may further include a detection unit configured to detect a center of gravity of the rotor disks.

The gas turbine may further include a control unit configured to determine an arrangement relationship or weight of the plurality of coupling pins such that the center of gravity of the compressor rotor disks detected by the detection unit corresponds to a center axis of the compressor rotor disks.

When the center of gravity of the compressor rotor disks is displaced to one side from the center axis of the compressor rotor disks, the control unit may determine the arrangement relationship or weight of the plurality of coupling pins such that a coupling pin having a relatively low weight is disposed at one side at which the center of gravity is located, or a coupling pin having a relatively high weight is disposed at a side opposite to the one side at which the center of gravity is located.

When the center of gravity of the compressor rotor disks is displaced to one side from the center axis of the compressor rotor disks, the control unit may determine the arrangement relationship or weight of the plurality of coupling pins such that the number of coupling pins disposed at one side at which the center of gravity is located is less than the number of coupling pins disposed at a side opposite to the one side at which the center of gravity is located.

Each of the coupling pins may be made of material having a high thermal expansion coefficient.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The above and other objects, features and other advantages of the present disclosure will be more clearly understood from the following detailed description taken in conjunction with the accompanying drawings, in which:

FIG. 1 is a diagram schematically illustrating a portion of a conventional gas turbine;

FIG. 2 is a sectional view illustrating a schematic structure of a gas turbine in accordance with an embodiment of the present disclosure;

FIG. 3 is a partial enlarged sectional view of a plurality of compressor rotor disks of FIG. 2;

FIG. 4 is an exploded sectional perspective view illustrating a compressor rotor disk of FIG. 2; and FIG. 5 is an exploded sectional perspective view illustrating a compressor rotor disk of a gas turbine in accordance with another embodiment of the present disclosure.

DESCRIPTION OF SPECIFIC EMBODIMENTS

Hereinafter, various embodiments of a rotor disk assembly and a gas turbine including the same in accordance with the present disclosure will be described with reference to FIGS. 2 to 5.

Furthermore, the terms used in the following description are defined considering the functions of the present disclosure and may vary depending on the intention or usual practice of a user or operator. The following embodiments are only examples of the contents proposed in the claims of the present disclosure rather than limiting the bounds of the present disclosure.

In the drawings, portions which are not related to the present disclosure will be omitted to explain the present disclosure more clearly. Reference should be made to the drawings, in which similar reference numerals are used throughout the different drawings to designate similar components. In addition, when an element is referred to as "comprising" or "including" a component, it does not preclude another component but may further include the other component unless the context clearly indicates otherwise.

FIG. 2 is a sectional view illustrating a schematic structure of a gas turbine in accordance with an embodiment of the present disclosure, FIG. 3 is a partial enlarged sectional view of a plurality of compressor rotor disks of FIG. 2, FIG. 4 is an exploded sectional perspective view illustrating a compressor rotor disk of FIG. 2, and FIG. 5 is an exploded sectional perspective view illustrating a compressor rotor disk of a gas turbine in accordance with another embodiment of the present disclosure.

Hereinafter, a gas turbine in accordance with an embodiment of the present disclosure will be described with reference to FIGS. 2 through 5.

The gas turbine 1 in accordance with the embodiment of the present disclosure may chiefly include a casing 100, a compressor 200 disposed in the casing 100 and configured to draw air thereinto and compress the air to a high pressure, a plurality of combustors 300 configured to mix fuel with air compressed by the compressor 200 and combust the mixture, and a turbine 400 configured to rotate a plurality of turbine blades using high-temperature and high-pressure combustion gas discharged from the combustors 300 and thus generate electricity.

The casing 100 may include a compressor casing 102 which houses the compressor 200 therein, a combustor casing 103 which houses the combustors 300 therein, and a turbine casing 104 which houses the turbine 400 therein. However, the present disclosure is not limited to this. For example, the compressor casing 102, the combustor casing 103, and the turbine casing 104 may be integrated with each other.

The compressor casing 102, the combustor casing 103, and the turbine casing 104 may be successively arranged from an upstream side to a downstream side in a fluid flow direction.

A rotor 500 may be rotatably provided in the casing 100. A generator (not shown) for generating electricity may be interlocked with the rotor 500. A diffuser may be provided at the downstream side of the casing 100 so that combustion gas that has passed through the turbine 400 is discharged to the outside through the diffuser.

The rotor 500 may include a compressor rotor disk 520, a turbine rotor disk 540, a torque tube 530, a tie rod 550, and a fastening nut 560. The compressor rotor disk 520 may be housed in the compressor casing 102. The turbine rotor disk 540 may be housed in the turbine casing 104. The torque tube 530 may be housed in the combustor casing 103 and couple the compressor rotor disk 520 with the turbine rotor disk 540. The tie rod 550 and the fastening nut 560 may couple the compressor rotor disk 520, the torque tube 530, and the turbine rotor disk 540 with each other.

In the embodiment, a plurality of (e.g., fourteen sheets of) compressor rotor disks 520 may be provided. The plurality of compressor rotor disks 520 may be arranged along an axial direction of the rotor 500. In other words, the compressor rotor disks 520 may form a multi-stage structure.

Each of the compressor rotor disks 520 may have an approximately circular plate shape, and include at an outer circumferential surface thereof a compressor blade coupling slot 522 through which a compressor blade 220 to be described later herein is coupled to the compressor rotor disk 520.

The turbine rotor disk 540 may be formed in a manner similar to that of the compressor rotor disk 520. In other words, a plurality of turbine rotor disks 540 may be provided. The plurality of turbine rotor disks 540 may be arranged along the axial direction of the rotor 500. In other words, the turbine rotor disks 540 may form a multi-stage structure.

Furthermore, each of the turbine rotor disks 540 may have an approximately circular plate shape, and include in an outer circumferential surface thereof a turbine blade coupling slot through which a turbine blade 420 to be described later herein is coupled to the turbine rotor disk 540.

The torque tube 530 may be a torque transmission member configured to transmit the rotating force of the turbine rotor disks 540 to the compressor rotor disks 520. One end of the torque tube 530 may be coupled to one of the plurality of compressor rotor disks 520 that is disposed at the most downstream end with respect to an air flow direction. The other end of the torque tube 530 may be coupled to one of the plurality of turbine rotor disks 540 that is disposed at the most upstream end with respect to a combustion gas flow direction. Here, a protrusion may be provided on each of the one and other ends of the torque tube 530. A depression to engage with the corresponding protrusion may be formed in each of the associated compressor rotor disk 520 and the associated turbine rotor disk 540. Thereby, the torque tube 530 may be prevented from rotating relative to the compressor rotor disk 520 or the turbine rotor disk 540.

The torque tube 530 may have a hollow cylindrical shape to allow air supplied from the compressor 200 to flow into the turbine 400 via the torque tube 530.

Taking into account the characteristics of the gas turbine that is continuously operated for a long period of time, the torque tube 530 may be formed to resist deformation, distortion, etc., and designed to be easily assembled or disassembled to facilitate maintenance.

The tie rod 550 may be provided to pass through the plurality of compressor rotor disks 520, the torque tube 530, and the plurality of turbine rotor disks 540. One end of the tie rod 550 may be coupled in one of the plurality of compressor rotor disks 520 that is disposed at the most upstream end with respect to the air flow direction. The other end of the tie rod 550 may protrude, in a direction opposite to the compressor 200, based on one of the plurality of turbine rotor disks 540 that is disposed at the most downstream end with respect to the combustion gas flow direction, and may be coupled to the fastening nut 560.

Here, the fastening nut 560 may compress, toward the compressor 200, the turbine rotor disk 540 that is disposed at the most downstream end. Thus, as the distance between the compressor rotor disk 520 that is disposed at the most upstream end and the turbine rotor disk 540 that is disposed at the most downstream end is reduced, the plurality of compressor rotor disks 520, the torque tube 530, and the plurality of turbine rotor disks 540 may be compressed in the axial direction of the rotor 500. Consequently, the plurality of compressor rotor disks 520, the torque tube 530, and the plurality of turbine rotor disks 540 may be prevented from moving in the axial direction or rotating relative to each other.

As such, since the plurality of compressor rotor disks 520 and the plurality of turbine rotor disks 540 are compressed onto each other in the axial direction by the tie rod 550 and the fastening nut 560, the compressor rotor disks 520 and the turbine rotor disks 540 may be prevented from moving in the axial direction or rotating relative to each other.

Moreover, the gas turbine in accordance with the present disclosure may have a structure such that adjacent rotor disks are coupled to each other by a separate coupling pin so as to prevent a slip between the rotor disks from occurring due to centrifugal forces generated when the rotor 500 rotates. This structure will be described in more detail later herein.

In the present embodiment, the single tie rod 550 is illustrated as being provided passing through the central portions of the plurality of compressor rotor disks 520, the torque tube 530, and the plurality of turbine rotor disks 540. However, the present disclosure is not limited to this. For example, separate tie rods may be respectively provided in a compressor side and a turbine side, a plurality of tie rods may be arranged along a circumferential direction, or a combination thereof is also possible.

In accordance with the above-mentioned configuration, opposite ends of the rotor 500 may be rotatably supported by bearings, and one end thereof may be coupled to a driving shaft of the generator.

The compressor 200 may include the compressor blade 220 which rotates along with the rotor 500, and a compressor vane 240 which is fixed in the casing 100 and configured to align the flow of air drawn to the compressor blade 220.

In the embodiment, a plurality of compressor blades 220 may be provided. The plurality of compressor blades 220 may form a multi-stage structure along the axial direction of the rotor 500. A plurality of compressor blades 220 may be provided in each stage, and may be radially formed and arranged along a rotation direction of the rotor 500.

In other words, a root part 222 of each of the compressor blades 220 is coupled to a compressor blade coupling slot 522 of the corresponding compressor rotor disk 520. The root part 222 may have a fir-tree shape to prevent the compressor blade 220 from being undesirably removed from the compressor blade coupling slot 522 in a rotational radial direction of the rotor 500.

Likewise, the compressor blade coupling slot 522 may also have a fir-tree shape to correspond to the root part 222 of the compressor blade 220.

In the present embodiment, each of the compressor blade root part 222 and the compressor blade coupling slot are described as having a fir-tree shape, but the present disclosure is not limited thereto, and, for example, each may have a dovetail shape or the like. Alternatively, the compressor blade may be coupled to the compressor rotor disk by using a separate coupling device, e.g., a fastener such as a key or a bolt, other than the above-mentioned coupling scheme.

Here, the compressor rotor disk 520 and the compressor blade 220 are generally coupled to each other in a tangential type or an axial type scheme. The present embodiment employs a so-called axial type scheme in which the compressor blade root part 222 is inserted into the compressor blade coupling slot 522 along the axial direction of the rotor 500, as described above. Accordingly, in the present embodiment, as shown in FIG. 4, a plurality of compressor blade coupling slots 522 may be formed. The plurality of compressor blade coupling slots 522 may be arranged along a circumferential direction of the compressor rotor disk 520.

In the embodiment, a plurality of compressor vanes 240 may be provided. The plurality of compressor vanes 240 may form a multi-stage structure along the axial direction of the rotor 500. Here, the compressor vanes 240 and the compressor blades 220 may be alternately arranged along the air flow direction.

Furthermore, a plurality of compressor vanes 240 may be provided in each stage, and may be radially formed and arranged along the rotation direction of the rotor 500.

The combustor 300 functions to mix air supplied from the compressor 200 with fuel and combust the fuel mixture to generate high-temperature and high-pressure combustion gas having high energy, and may be configured to increase the temperature of the combustion gas to a heat resistance limit within which the combustor 300 and the turbine can resist heat in an isobaric combustion process.

In detail, a plurality of combustors 300 may be provided. The plurality of combustors 300 may be arranged in the combustor casing along the rotation direction of the rotor 500.

Each of the combustors 300 may include a liner into which air compressed by the compressor 200 is drawn, a burner configured to inject fuel to the air drawn into the liner and combust the fuel mixture, and a transition piece configured to guide combustion gas generated by the burner to the turbine.

The liner may include a flame tube which defines a combustion chamber, and a flow sleeve which encloses the flame tube and forms an annular space.

The burner may includes a fuel injection nozzle provided on a front end side of the liner to inject fuel to air drawn into the combustion chamber, and an ignition plug provided in a sidewall of the liner to ignite the fuel mixture formed by mixing the fuel with the air in the combustion chamber.

The transition piece may be configured such that an outer sidewall of the transition piece can be cooled by air supplied from the compressor so as to prevent the transition piece from being damaged by high-temperature combustion gas.

In more detail, a cooling hole is formed in the transition piece so that air can be injected into the transition piece through the cooling hole so as to cool a main body of the transition piece.

On the one hand, air used to cool the transition piece may flow into the annular space of the liner, and collides with air provided as cooling air from the outside of the flow sleeve through a cooling hole formed in the flow sleeve that forms the outer sidewall of the liner.

Although not shown, a so-called deswirler functioning as a guide vane may be provided between the compressor 200 and the combustor 300 so as to adjust a flow angle at which air is drawn into the combustor 300.

The turbine 400 may be formed in a manner similar to that of the compressor 200. In more detail, the turbine 400 may include the turbine blade 420 which rotates along with the rotor 500, and a turbine vane 440 which is fixed in the casing 100 and configured to align the flow of combustion gas to be drawn onto the turbine blade 420.

In the embodiment, a plurality of turbine blades 420 may be provided. The plurality of turbine blades 420 may form a multi-stage structure along the axial direction of the rotor 500. A plurality of turbine blades 420 may be provided in each stage, and may be radially formed and arranged along the rotation direction of the rotor 500.

In other words, a root part 422 of each of the turbine blades 420 is coupled to a turbine blade coupling slot of the corresponding turbine rotor disk 540. The root part 422 may have a fir-tree shape to prevent the turbine blade 420 from being undesirably removed from the turbine blade coupling slot in a rotational radial direction of the rotor 500.

Likewise, the turbine blade coupling slot may also have a fir-tree shape to correspond to the root part 422 of the turbine blade 420.

In the present embodiment, each of the turbine blade root part 422 and the turbine blade coupling slot are described as having a fir-tree shape, but the present disclosure is not limited thereto, and, for example, each may have a dovetail shape or the like. Alternatively, the turbine blade may be coupled to the turbine rotor disk by using a separate coupling device, e.g., a fastener such as a key or a bolt, other than the above-mentioned coupling scheme.

Here, the turbine rotor disk 540 and the turbine blade 420 are generally coupled to each other in a tangential type or an axial type scheme. The present embodiment employs a so-called axial type scheme in which the turbine blade root part 422 is inserted into the turbine blade coupling slot in the axial direction of the rotor 500, as described above. Accordingly, in the present embodiment, a plurality of turbine blade coupling slots may be formed. The plurality of turbine blade coupling slots may be arranged along a circumferential direction of the turbine rotor disk 540.

In the embodiment, a plurality of turbine vanes 440 may be provided. The plurality of turbine vanes 440 may form a multi-stage structure along the axial direction of the rotor 500. Here, the turbine vanes 440 and the turbine blades 420 may be alternately arranged along the air flow direction.

Furthermore, a plurality of turbine vanes 440 may be provided in each stage, and may be radially formed and arranged along the rotation direction of the rotor 500.

Here, unlike the compressor 200, the turbine 400 makes contact with high-temperature and high-pressure combustion gas. Hence, the turbine 400 requires a cooling unit for preventing damage such as thermal deterioration.

Given this, the gas turbine in accordance with the present embodiment may further include a cooling passage through which compressed air drawn out from some portions of the compressor 200 is supplied to the turbine 400.

Depending on embodiments, the cooling passage may extend outside the casing 100 (defined as an external passage), or extend through the interior of the rotor 500 (defined as an internal passage). Alternatively, both the external passage and the internal passage may be used.

Here, the cooling passage may communicate with a turbine blade cooling passage formed in the turbine blade 420 so that the turbine blade 420 can be cooled by cooling air.

Furthermore, the turbine blade cooling passage may communicate with a turbine blade film cooling hole formed in the surface of the turbine blade 420, so that cooling air is supplied to the surface of the turbine blade 420, whereby the turbine blade 420 may be cooled in a so-called film cooling manner by the cooling air.

In addition, the turbine vane 440 may also be formed to be cooled by cooling air supplied from the cooling passage, in a manner similar to that of the turbine blade 420.

In the gas turbine 1 having the above-mentioned configuration, air drawn into the casing 100 is compressed by the compressor 200. The air compressed by the compressor 200 is mixed with fuel by the combustors 300, and the fuel mixture is combusted by the combustors 300, so that combustion gas is generated. The combustion gas generated by the combustors 300 is drawn into the turbine 400. The combustion gas drawn into the turbine 400 passes through the turbine blades 420 and thus rotates the rotor 500, before being discharged to the atmosphere through the diffuser. The rotor 500 that is rotated by the combustion gas may drive the compressor 200 and the generator. In other words, some of mechanical energy obtained from the turbine 400 may be supplied as energy needed for the compressor 200 to compress air, and the other mechanical energy may be used to produce electricity in the generator.

Here, the above-described gas turbine is only an embodiment of the present disclosure, and a rotor disk assembly according to the present disclosure, which will be described in detail later herein, may be applied to all general gas turbines.

Hereinafter, the rotor disk assembly in accordance with the present disclosure will be described with reference to FIGS. 3 to 5.

The rotor disk assembly in accordance with the present disclosure may include a plurality of rotor disks disposed parallel to each other, a tie rod configured to pass through the plurality of rotor disks and couple the rotor disks to each other, a plurality of coupling depressions formed in each of facing surfaces of the plurality of rotor disks, and a plurality of coupling pins each having opposite ends which are inserted into the corresponding respective coupling depressions of the facing surfaces.

Here, each of the plurality of rotor disks may be the compressor rotor disk 520 or the turbine rotor disk 540 of the gas turbine 1 described above, or a rotor disk of a general rotating body.

As such, the rotor disk assembly according to the present disclosure may be applied not only to the gas turbine but also to any rotating body structure so long as it includes a rotor disk. In the present embodiment, descriptions will be made on the assumption that the rotor disk assembly is applied to the compressor rotor disk 520 of the above-described gas turbine.

In other words, as described above, the plurality of compressor rotor disks 520 are arranged parallel to each other along the axial direction of the rotor 500, and the tie rod 550 passes through the central portions of the plurality of compressor rotor disks 520 and couples the plurality of compressor rotor disks 520 to each other.

Here, the coupling depressions 600 are formed in the respective facing surfaces of the plurality of compressor rotor disks 520. Each end of the coupling pins 700 is inserted into a corresponding one of the coupling depressions 600 of the facing surfaces so that the adjacent compressor rotor disks 520 are coupled to each other.

In detail, as shown in FIG. 3, one or more coupling depressions 600 are formed in each of the facing surfaces of the plurality of compressor rotor disks 520. Hereafter, if the description is made based on a pair of adjacent compressor rotor disks 520*a* and 520*b*, it should be understood that a plurality of coupling depressions 600*a* and 600*b* are respectively formed in the facing surfaces.

In other words, the coupling depressions 600*a* and 600*b* are respectively formed in the surface of the first-side-disposed compressor rotor disk 520*a* that faces the second-side-disposed compressor rotor disk 520*b* and in the surface of the second-side-disposed compressor rotor disk 520*b* that faces the first-side-disposed compressor rotor disk 520*a*. The opposite ends of one coupling pin 700 are respectively inserted into the pair of coupling depressions 600*a* and 600*b* facing each other so that the pair of adjacent compressor rotor disks 520*a* and 520*b* are coupled to each other.

In particular, each of the compressor rotor disks 520 may include coupling protrusions 524 which protrude in opposite directions along the axial direction of the rotor 500. The coupling depressions 600 may be formed in the coupling protrusions 524.

In more detail, as shown in FIGS. 3 and 4, the compressor rotor disk 520 has an approximately circular plate shape. The coupling protrusion 524 may be formed in the form of a ring protruding in the axial direction from each of the axial opposite surfaces of the compressor rotor disk 520, and may have a rectangular cross-sectional shape.

Here, as shown in FIG. 4, the coupling depressions 600 are formed in both the facing surfaces of the plurality of compressor rotor disks 520, and a plurality of coupling depressions 600 are formed in each of the facing surfaces along a circumferential direction of the compressor rotor disks 520. In other words, a plurality of coupling depressions 600 are formed in each coupling protrusion 524 along the circumferential direction of the coupling protrusion 524.

The number of coupling depressions 600 formed in each of the facing surfaces may be changed in various ways. Although the coupling pins 700 may be inserted into all of the plurality of coupling depressions 600 formed in each of the facing surfaces, they may be inserted into only some of the coupling depressions 600 for the purposes of a balancing operation, etc., which will be described later herein.

In the present embodiment, the coupling depressions 600 formed in the facing surfaces of the plurality of compressor rotor disks 520 face each other to be symmetric. In other words, the pair of coupling depressions 600a and 600b described above are symmetrical with each other, so that when the pair of adjacent compressor rotor disks 520a and 520b come into contact with each other, the pair of coupling depressions 600a and 600b form a single linear hole.

However, the present disclosure is not limited to this. For example, the coupling depressions formed in the facing surfaces may be located at different positions. In addition, although the coupling depressions are located at the same positions, the coupling depressions are oriented at a predetermined angle with respect to the rotating shaft of the rotor 500. In this case, the coupling pin may also have a shape corresponding to that of the coupling depressions so that the adjacent compressor rotor disks can be coupled to each other.

In the present embodiment, the coupling pin 700 may have a cylindrical shape. Hence, the coupling depression 600 is also formed in the form of a circular hole corresponding to the shape of the coupling pin 700. One end of the coupling pin 700 is inserted into the coupling depression 600a of the compressor rotor disk 520a disposed at the first side, and the other end thereof is inserted into the coupling depression 600b of the compressor rotor disk 520b disposed at the second side, respectively.

Here, an external thread 702 may be formed on an outer circumferential surface of one end of the coupling pin 700. An internal thread 602 corresponding to the external thread 702 may be formed in the coupling depression 600 into which the one end of the coupling pin 700 is inserted.

Hence, when the adjacent compressor rotor disks 520 are coupled to each other, one end of the coupling pin 700 may be first threaded into and fixed to the coupling depression 600 of one compressor rotor disk, and thereafter the other end of the coupling pin 700 may be inserted into the coupling depression 600 of the other compressor rotor disk. Therefore, the coupling process of the adjacent compressor rotor disks 520 may be facilitated, and the compressor rotor disks 520 may be reliably coupled to each other.

In the present embodiment, as shown in FIG. 4, the external thread 702 is formed on one end of the coupling pin 700 that corresponds to a half of the coupling pin 700, and the internal thread 602 corresponding to this is formed in the coupling depression 600 of the compressor rotor disk into which the one end of the coupling pin 700 is inserted. In other words, the internal threads 602 are formed in only a plurality of the coupling depressions 600 formed on one surface of each compressor rotor disk 520 among the plurality of coupling depressions 600 formed in the axial opposite surfaces of the compressor rotor disk 520.

However, the present disclosure is not limited to this. For example, an external thread may be formed on the entirety of the outer circumferential surface of the coupling pin, and the coupling pin may be fixed into the coupling depression by using a separate member or by pressing, as well as by a threaded coupling scheme.

Furthermore, the coupling pin 700 may be made of material having a high thermal expansion coefficient. Hence, as the temperature of the coupling pin 700 increases when the rotor 500 rotates, the coupling pin 700 is expanded and thus compressed in the coupling depression 600, whereby a gap may be prevented from being created between the coupling pin 700 and the coupling depression 600. Thereby, the torque transmission performance may be enhanced.

As such, not only may the plurality of compressor rotor disks 520 be compressed onto and coupled to each other by the tie rod 550 such that they are prevented from moving in the axial direction or rotating relative to each other, but the adjacent compressor rotor disks 520 may also be coupled to each other by the separate coupling pins 700 inserted in the axial direction of the rotor 500. Therefore, although the centrifugal force is applied to the compressor rotor disks 520 when the rotor 500 rotates, a slip may be prevented from occurring between the compressor rotor disks 520.

Furthermore, since the coupling pins 700 are inserted into the compressor rotor disks 520 at positions arranged along the circumferential direction of the compressor rotor disks 520, the adjacent compressor rotor disks 520 may be more reliably coupled to each other.

Consequently, the torque transmission between the compressor rotor disks 520 may be smoothly performed.

A compressor rotor disk of a gas turbine in accordance with another embodiment of the present disclosure will be described with reference to FIG. 5. In this embodiment, the coupling depression and the coupling pin may have shapes different from those of the above-mentioned embodiment.

The coupling pin 1700 according to this embodiment may have a curved shape, which is concave toward a center axis of the compressor rotor disk 520.

In more detail, as shown in FIG. 5, in the case where the coupling pin 1700 is inserted into a corresponding coupling depression 1600 of the compressor rotor disk 520, opposite side surfaces of the coupling pin 170 with respect to the circumferential direction of the compressor rotor disk 520 may be formed to define a portion of a concentric circle with the same center as that of the compressor rotor disk 520.

Here, the coupling depression 1600 into which the coupling pin 1700 is inserted may have a shape corresponding to that of the coupling pin 1700.

The effect of coupling the adjacent compressor rotor disks 520 to each other by the coupling pins 1700 is similar or the same as that of the above-mentioned embodiment. Furthermore, since the coupling pin 1700 has a curved shape, the coupling pin 1700 may be prevented from being undesirably removed from the coupling depression 1600. The center of the plurality of coupling pins 1700 that are inserted into the compressor rotor disk 520 at positions arranged along the circumferential direction is the same as that of the compressor rotor disk 520, whereby the balancing operation may be more efficiently performed.

In addition, the shapes of the coupling pin and the coupling depression may be changed in various ways.

Referring back FIG. 2, the present disclosure may further include a detection unit 800 configured to detect the center of gravity of the compressor rotor disk 520, and a control unit 900 configured to determine the arrangement relationship or weight of the plurality of coupling pins 700 such that the center of gravity of the compressor rotor disk 520 detected by the detection unit 800 corresponds to the center axis CL of the compressor rotor disk 520.

The detection unit 800 may detect the center of gravity of each of the plurality of compressor rotor disks 520, or may detect the center of gravity of all of the plurality of compressor rotor disks 520.

The detection unit 800 may detect the center of gravity of the compressor rotor disk 520 by various schemes. In the case where the rotor 500 biasedly rotates and generates vibrations when rotating, it is regarded that the center of gravity of the compressor rotor disk 520 is not disposed on the center axis CL of the compressor rotor disks 520.

In the present embodiment, since the tie rod 550 passes through the center of the compressor rotor disk 520, the center axis CL of the compressor rotor disk 520 may be regarded as being the same as a center axis of the tie rod 550.

Therefore, in the case where the center of gravity of the compressor rotor disk 520 detected by the detection unit 800 is displaced to one side from the center axis CL of the compressor rotor disk 520, the control unit 900 determines the arrangement relationship or weight distribution of the plurality of coupling pins 700 such that the center of gravity of the compressor rotor disk 520 is disposed on the center axis CL of the compressor rotor disk 520.

In other words, in the case where the center of gravity of the compressor rotor disk 520 is displaced to one side from the center axis CL of the compressor rotor disk 520, the control unit 900 may determine the arrangement of the coupling pins 700 such that a coupling pin 700 having a relatively low weight is disposed at one side at which the center of gravity is located, or a coupling pin 700 having a relatively high weight is disposed at a side opposite to the one side at which the center of gravity is located.

Thereby, the center of gravity of the compressor rotor disk 520 is moved to the opposite side at which the coupling pin 700 having a relatively high weight is disposed, so that the center of gravity of the compressor rotor disk 520 may be close to the center axis CL, and may be ultimately disposed on the center axis CL of the compressor rotor disk 520.

Here, the coupling pin 700 may be regarded as functioning not only to couple the corresponding adjacent compressor rotor disks 520 but also acts as a balancing weight for the (compressor and turbine) rotor disks.

Furthermore, in the case where the center of gravity of the compressor rotor disk 520 is displaced to one side from the center axis CL of the compressor rotor disk 520, the control unit 900 may determine the arrangement of the coupling pins 700 such that the number of coupling pins 700 disposed at the side opposite to the one side is greater than the number of coupling pins 700 disposed at the one side at which the center of gravity is located.

Thereby, in the same manner, the center of gravity of the compressor rotor disk 520 is moved to the opposite side at which a comparatively large number of coupling pins 700 are disposed to increase the weight, so that the center of gravity of the compressor rotor disk 520 may be close to the center axis CL, and may be ultimately disposed on the center axis CL of the compressor rotor disk 520.

For the above-mentioned balancing operation, of course, the coupling pins 700 may be inserted into only some of the plurality of coupling depressions 600 that are formed in each of the facing surfaces of the plurality of compressor rotor disks 520 along the circumferential direction of the compressor rotor disks 520.

Furthermore, even when the center of gravity of the compressor rotor disk 520 is disposed on the center axis CL, if the weight of the rotor 500 is biased to one side rater than being evenly distributed, the rotation of the rotor 500 is unstable, and vibrations may occur. Therefore, in this case, also, the number or weight of coupling pins 700 disposed between the adjacent respective compressor rotor disks 520 facing each other may be adjusted to promote reliable rotation of the rotor 500.

As such, the center of gravity of the compressor rotor disk 520 may be adjusted to be disposed on the center axis CL of the compressor rotor disk 520 by adjusting the arrangement relationship or weight distribution of the coupling pins 700 determined by the control unit 900. Consequently, vibrations may be prevented from occurring when the rotor 500 rotates, and the gas turbine 1 may be reliably operated.

In accordance with the present disclosure, since rotor disks are coupled to each other by a coupling pin, a slip between the rotor disks may be prevented from occurring due to centrifugal force generated when the rotor disks rotate.

Furthermore, a balancing operation may be performed such that the center of gravity of the rotor disks is the same as that of a rotating shaft of the rotor disks, whereby vibrations are reduced, and a gas turbine may be thus reliably operated.

The inventive features mentioned herein can also be described as follows. In a gas turbine or similar equipment, multiple rotor disks are provided in the compressor, the turbine, or the like. Although such rotor disks are located adjacent to each other and coupled to a central shaft, after prolonged use and high-speed rotations, strong centrifugal forces acting thereon may cause rotor disk slippage or other misalignment issues. Thus, a special means provided between adjacent rotor disks serve the dual purpose of coupling the adjacent rotor disks more securely and also allowing weight balancing adjustments to be made for the gas turbine.

The special means can be coupling pins 700 that are cylindrical in shape with screw threads on its outer surface, or coupling pins 1700 that are elongated strips with particular curvature. Elements of other shapes and sized can be used as well. Such coupling pines are received in counterpart holes, grooves, or the like, in radially spaced apart locations along the rotor disks. The total number of coupling pins, the particular weight of each coupling pin, etc. can be changed accordingly in order to make any weight balancing adjustments if the gas turbine is found to generate too much vibrations or if there are irregular rotations about the central shaft.

The effects of the present disclosure are not limited to the above-mentioned effects, and it should be understood that the effects of the present disclosure include all effects that can be inferred from the configuration of the invention described in the detailed description of the present disclosure or the appended claims.

The present disclosure is not limited to specific embodiments or descriptions, and it will be apparent to those skilled in the art that various changes or modifications are possible without departing from the scope of the invention as defined in the following claims. It should be noted that these changes or modifications also fall within the bounds of the invention.

What is claimed is:

1. A rotor disk assembly comprising:
a plurality of rotor disks disposed parallel to each other such that pairs of adjacent rotor disks of the plurality of rotor disks each include a first rotor disk and a second rotor disk, the first and second rotor disks facing each other along facing surfaces of a corresponding pair of the pairs of adjacent rotor disks;
a tie rod passing through a center axis of each of the plurality of rotor disks and coupling the plurality of rotor disks to each other;
a plurality of coupling depressions respectively formed in each of the facing surfaces of the plurality of rotor disks; and
a plurality of coupling pins each having an elongated strip shape that is curved in a circumferential direction with respect to the tie rod,
wherein each of the plurality of coupling pins includes an inner circumferential surface disposed toward the center axis and an outer circumferential surface disposed opposite the inner circumferential surface, the inner circumferential surface formed to define a portion of an inner concentric circle with respect to the center axis, the outer circumferential surface formed to define a portion of an outer concentric circle with respect to the center axis, and
wherein each of the plurality of coupling depressions is configured to receive opposite ends of a corresponding coupling pin of the plurality of coupling pins.

2. The rotor disk assembly according to claim 1,
wherein each of the facing surfaces of the first rotor disk and the second rotor disk includes a coupling protrusion protruding toward an opposite one of the first rotor disk and the second rotor disk, and
wherein the plurality of coupling depressions include a first coupling depression disposed in the coupling protrusion of the first rotor disk and a second coupling depression disposed in the coupling protrusion of the second rotor disk.

3. The rotor disk assembly according to claim 1, wherein the plurality of coupling depressions are formed in each of the facing surfaces of the plurality of rotor disks along a circumferential direction of the rotor disks.

4. The rotor disk assembly according to claim 1, wherein the coupling depressions formed in the facing surfaces of the plurality of rotor disks face each other to be symmetric.

5. The rotor disk assembly according to claim 1, wherein the tie rod at the center axis of each of the plurality of rotor disks transmits vibration information of the plurality of rotor disks, the vibration information enabling detection of a center of gravity of the rotor disks.

6. The rotor disk assembly according to claim 5, wherein the plurality of coupling pins have an arrangement relationship or weight distribution that is adjustable so that the center of gravity of the rotor disks corresponds to the center axis of the rotor disks.

7. The rotor disk assembly according to claim 6, wherein, when the center of gravity of the rotor disks is displaced to one side from the center axis of the rotor disks, the arrangement relationship or weight distribution of the plurality of coupling pins is adjusted by disposing a coupling pin having a relatively low weight at one side at which the center of gravity is located, or by disposing a coupling pin having a relatively high weight at a side opposite to the one side at which the center of gravity is located.

8. The rotor disk assembly according to claim 6, wherein, when the center of gravity of the rotor disks is displaced to one side from the center axis of the rotor disks, the arrangement relationship or weight distribution of the plurality of coupling pins is adjusted by disposing a first number of coupling pins at one side at which the center of gravity is located and by disposing a second number of coupling pins at a side opposite to the one side at which the center of gravity is located, the first number being less than the second number.

9. A gas turbine comprising:
a casing;
a compressor disposed in the casing and configured to draw air thereinto and compress the air to a high pressure;
a plurality of combustors configured to mix fuel with the air compressed by the compressor and combust a mixture of the fuel and the air;
a turbine configured to rotate a plurality of turbine blades using high-temperature and high-pressure combustion gas discharged from the combustor and generate electricity; and
a rotor provided in a central portion of the casing such that the rotor passes through the compressor, the combustors, and the turbine, the rotor being rotatably supported by a bearing,
wherein the rotor comprises:
a plurality of rotor disks disposed parallel to each other such that pairs of adjacent rotor disks of the plurality of rotor disks each include a first rotor disk and a second rotor disk, the first and second rotor disks facing each other along facing surfaces of a corresponding pair of the pairs of adjacent rotor disks;
a tie rod passing through a center axis of each of the plurality of rotor disks and coupling the plurality of rotor disks to each other;
a plurality of coupling depressions respectively formed in each of the facing surfaces of the plurality of rotor disks; and
a plurality of coupling pins each having an elongated strip shape that is curved in a circumferential direction with respect to the tie rod,
wherein each of the plurality of coupling pins includes an inner circumferential surface disposed toward the center axis and an outer circumferential surface disposed opposite the inner circumferential surface, the inner circumferential surface formed to define a portion of an inner concentric circle with respect to the center axis, the outer circumferential surface formed to define a portion of an outer concentric circle with respect to the center axis, and
wherein each of the plurality of coupling depressions is configured to receive opposite ends of a corresponding coupling pin of the plurality of coupling pins.

10. The gas turbine according to claim 9,
wherein the plurality of rotor disks disposed parallel to each other are a plurality of compressor rotor disks configured to be coupled to a plurality of turbine rotor disks via a torque tube,
wherein each of the facing surfaces of the first rotor disk and the second rotor disk includes a coupling protrusion protruding toward an opposite one of the first rotor disk and the second rotor disk, and
wherein the plurality of coupling depressions include a first coupling depression disposed in the coupling protrusion of the first rotor disk and a second coupling depression disposed in the coupling protrusion of the second rotor disk.

11. The gas turbine according to claim 10, wherein the plurality of coupling depressions are formed in each of the facing surfaces of the plurality of compressor rotor disks along a circumferential direction of the compressor rotor disks.

12. The gas turbine according to claim 10, wherein the coupling depressions formed in the facing surfaces of the plurality of compressor rotor disks face each other to be symmetric.

13. The gas turbine according to claim 10, wherein the tie rod at the center axis of each of the plurality of rotor disks transmits vibration information of the plurality of rotor disks, the vibration information enabling detection of a center of gravity of the rotor disks.

14. The gas turbine according to claim 13, wherein the plurality of coupling pins have an arrangement relationship or weight distribution that is adjustable so that the center of gravity of the rotor disks corresponds to the center axis of the rotor disks.

15. The gas turbine according to claim 14, wherein, when the center of gravity of the rotor disks is displaced to one side from the center axis of the rotor disks, the arrangement relationship or weight distribution of the plurality of coupling pins is adjusted by disposing a coupling pin having a relatively low weight at one side at which the center of gravity is located, or by disposing a coupling pin having a relatively high weight at a side opposite to the one side at which the center of gravity is located.

16. The gas turbine according to claim 14, wherein, when the center of gravity of the rotor disks is displaced to one side from the center axis of the rotor disks, the arrangement relationship or weight distribution of the plurality of coupling pins is adjusted by disposing a first number of coupling pins at one side at which the center of gravity is located and by disposing a second number of coupling pins at a side opposite to the one side at which the center of gravity is located, the first number being less than the second number.

* * * * *